US011123785B2

(12) United States Patent
Sasaki et al.

(10) Patent No.: US 11,123,785 B2
(45) Date of Patent: Sep. 21, 2021

(54) SURFACE-TREATED STEEL SHEET PART HAVING CUT END SURFACE, AND CUTTING METHOD THEREFOR

(71) Applicant: NIPPON STEEL CORPORATION, Tokyo (JP)

(72) Inventors: Hirokazu Sasaki, Tokyo (JP); Naofumi Nakamura, Tokyo (JP); Yudai Yamamoto, Tokyo (JP)

(73) Assignee: NIPPON STEEL CORPORATION, Tokyo (JP)

(*) Notice: Subject to any disclaimer, the term of this patent is extended or adjusted under 35 U.S.C. 154(b) by 13 days.

(21) Appl. No.: 16/451,519

(22) Filed: Jun. 25, 2019

(65) Prior Publication Data

US 2019/0321874 A1 Oct. 24, 2019

Related U.S. Application Data

(63) Continuation of application No. PCT/JP2016/088759, filed on Dec. 26, 2016.

(51) Int. Cl.
*B21D 28/14* (2006.01)
*B32B 15/01* (2006.01)
(Continued)

(52) U.S. Cl.
CPC ............ *B21D 28/14* (2013.01); *B26F 1/14* (2013.01); *B32B 15/013* (2013.01); *C22C 18/04* (2013.01);
(Continued)

(58) Field of Classification Search
CPC .. B21D 28/14; B21D 15/013; B21D 2255/06; B21D 35/007; B21D 28/02; B26F 1/14;
(Continued)

(56) References Cited

U.S. PATENT DOCUMENTS

2016/0197353 A1* 7/2016 Osaki .................... H01G 11/70
429/242
2017/0080475 A1* 3/2017 Matsuno ................. B21D 28/14
2017/0320122 A1 11/2017 Matsuno et al.

FOREIGN PATENT DOCUMENTS

CN 101748406 A 6/2010
JP H09300295 A 11/1997
(Continued)

OTHER PUBLICATIONS

CNIPA Office Action for corresponding CN Patent Application No. 201680091856.1, dated Apr. 7, 2020.
(Continued)

*Primary Examiner* — Ghassem Alie
(74) *Attorney, Agent, or Firm* — Birch, Stewart, Kolasch & Birch, LLP

(57) ABSTRACT

In this part that includes a cut end surface consisting of a surface-treated steel sheet that has been cut, the shape of the cut end surface is such that the length of a first shear droop occurring in the sheet thickness direction is at least 0.10 times the sheet thickness of the surface-treated steel sheet, and the length of a second sheer droop occurring in the planar direction is at least 0.45 times the sheet thickness of the surface-treated steel sheet. Furthermore, in the cutting process a die is used for which the clearance between the punch and the die is 1-20% of the plate thickness of the surface-treated steel plate, and the shoulder portion of the die and/or the punch is provided with a radius of curvature of at least 0.12 times the plate thickness of the surface-treated steel plate.

4 Claims, 2 Drawing Sheets

(51) Int. Cl.
    *C22C 18/04*    (2006.01)
    *B26F 1/14*    (2006.01)
(52) U.S. Cl.
    CPC ..... *B32B 2255/06* (2013.01); *B32B 2255/205* (2013.01)
(58) Field of Classification Search
    CPC ... B26F 1/02; B32B 15/013; B32B 2255/205; C22C 18/04; H01M 4/742; H01G 11/70; H01G 11/84; Y10T 83/9435; Y10T 83/9432; Y10T 83/9424
    USPC ...... 83/55.14, 685, 23, 29, 37, 30, 686, 687, 83/688, 689, 691, 693, 694
    See application file for complete search history.

(56) References Cited

FOREIGN PATENT DOCUMENTS

| | | |
|---|---|---|
| JP | H1015723 A | 1/1998 |
| JP | H10280116 A | 10/1998 |
| JP | H1131774 A | 2/1999 |
| JP | 2006224151 A | 8/2006 |
| JP | 2009287082 A | 12/2009 |
| JP | 2010172944 A | 8/2010 |
| JP | 5272518 B2 | 8/2013 |
| JP | 5643615 B2 | 12/2014 |
| JP | 2014231094 A | 12/2014 |
| JP | 2015157314 A | 9/2015 |
| JP | 6073025 B1 | 2/2017 |
| KR | 20090009078 U | 9/2009 |
| WO | 2016092657 A1 | 6/2016 |

OTHER PUBLICATIONS

Extended European Search Report corresponding to Application No. 16925115.4-1016 PCT/JP2016088759; dated Sep. 13, 2019.
Office Action issued in Indian Patent Application No. IN201917025094 dated Mar. 26, 2021.

* cited by examiner

SURFACE-TREATED STEEL SHEET PART HAVING CUT END SURFACE, AND CUTTING METHOD THEREFOR

CROSS REFERENCE TO RELATED APPLICATIONS

This application is a bypass continuation under 35 U.S.C. § 120 of PCT/JP2016/088759, filed Dec. 26, 2016, the entire content of which is also incorporated herein by reference.

TECHNICAL FIELD

The present invention relates to a part for use in automobiles, home electronics products, and others, the part including a surface treated steel sheet as a raw material and having excellent corrosion resistance on an end-face created by a cutting process. The present invention also relates to a method of performing a cutting process for producing the part.

BACKGROUND ART

Conventional parts which have been used in automobiles, home electronics, and others are produced by performing cutting and plastic working of a raw material of a cold-rolled steel sheet to obtain a desired shape, and then performing surface treatment. However, for the purposes of improving corrosion resistance of parts, reducing cost by simplifying production steps, and the like, parts increasingly used in recent years are produced by performing cutting and plastic working of a raw material of a pre-surface treated steel sheet so that surface treatment after plastic working can be omitted. Here, when surface treatment is performed after cutting and plastic working, the cut end-face is simultaneously surface-treated. Therefore, the cut end-face will have similar corrosion resistance as a planar portion. However, when a surface-treated steel sheet is used as a raw material, and a step of performing surface treatment is omitted after cutting and plastic working, a cut end-face remains as it was cut, exposing an underlying steel material. This may result in the development of red rust on the cut end-face depending on an environment where the part is placed. A cut end-face with red rust may result in poor appearance, and in addition, a red-rusted area may spread to a surface treated planar portion over time. Therefore, concerns include a decreased strength of a part; and in particular for home electronics products, electrical short due to detached rust; and others.

As a method of improving antirust performance of an end face created by a punching process, for example, Patent Document 1 proposes a method involving punching a Zn-based plated steel sheet with a sheet thickness of 2 mm or less using a die apparatus including a punch and a die, in which a shoulder portion of either one of the punch or the die has a curvature radius 0.1 to 0.5 times of the sheet thickness of the Zn-based plated steel sheet, and a punched end-face after the punching process has a shear surface ratio of 90% or more and a zinc coverage of 50% or more on a shear surface. Further, Patent Document 2 proposes a method in which the shape of a cut end-face satisfies the following expression (1):

$$t2/(M*Rs) \leq 0.2 \quad (1)$$

wherein t: a sheet thickness, M: a coating weight of Zn, and Rs: a shear surface ratio.

Patent Document 1: Japanese Patent No. 5272518
Patent Document 2: Japanese Unexamined Patent Application, Publication No. H10-280116

DISCLOSURE OF THE INVENTION

Problems to be Solved by the Invention

However, the methods proposed in Patent Documents 1 and 2 are intended to be used when the sheet thickness is up to 2.0 mm or less, and can not be applied to a material having a sheet thickness of more than 2.0 mm because insufficient coating of Zn on a shear surface may result in the development of rest rust. Accordingly, an object of the present invention is to provide a part capable of preventing the development of red rust on an end-face created by a cutting process even when a surface treated steel sheet having a sheet thickness of more than 2.0 mm is mainly used as a raw material.

Means for Solving the Problems

After performing experiments and examinations to achieve the above object, the present inventors found that the development of red rust on an end-face created by a cutting process (hereafter, may also be referred to as a "cut end-surface") in an early stage after the cutting process is significantly affected by a first shear droop appearing in the sheet-thickness direction of cut end-surface and a second shear droop appearing in the planar direction of cut end-surface. Further, the present inventors concluded that the development of red rust on a cut end-face can be prevented by controlling these values within certain ranges, leading to remarkably improved corrosion resistance. The points are as follows.

1) A part including a cut end-face of a surface treated steel sheet created by a cutting process and having excellent corrosion resistance at the cut end-face, wherein the shape of the cut end-face is such that a first shear droop appearing in a sheet-thickness direction has a length 0.10 times or more of a sheet thickness of the surface treated steel sheet, and a second shear droop appearing in a planar direction has a length 0.45 times or more of the sheet thickness of the surface treated steel sheet, and a surface of the cut end-face is coated and wrapped around with a plating metal layer, the plating metal layer being originally coated on a surface of the surface treated steel sheet.

2) A method of performing a cutting process of a surface treated steel sheet using a die apparatus including a die and a punch, the method including: performing cutting using the die apparatus so that the shape of a cut end-face created by the cutting process is such that a first shear droop appearing in a sheet-thickness direction has a length 0.10 times or more of a sheet thickness of the surface treated steel sheet, and a second shear droop appearing in a planar direction has a length 0.45 times or more of the sheet thickness of the surface treated steel sheet, the die apparatus being configured so that a clearance between the die and the punch is 1 to 20% of the sheet thickness of the surface treated steel sheet, and a shoulder of either one of the die or the punch has a curvature radius 0.12 times or more of the sheet thickness of the surface treated steel sheet.

Effects of the Invention

As described above, the present invention can provide a part having excellent corrosion resistance on a cut end-surface created by a cutting process even when a surface treated steel sheet is used as a raw material.

BRIEF DESCRIPTION OF THE DRAWINGS

FIG. 1A schematically illustrates a method of performing a cutting process when curvature radii are conferred on die shoulders; FIG. 1B schematically illustrates a method of performing a cutting process when curvature radii are conferred on punch shoulders.

PREFERRED MODE FOR CARRYING OUT THE INVENTION

The present inventors conducted experiments in which the sheet thickness of a surface treated steel sheet, conditions of a cutting process, conditions of surface treatment, and others were varied within various ranges to investigate a relationship between the development state of red rust on a cut end-face and the shape of the cut end-face, and others. After these extensive studies, the present inventors found that the development of red rust on a cut end-face over time after a cutting process can be prevented by performing the cutting process so that the lengths of shear droops on the cut end-face are such that a first shear droop falls within a range of 0.10 times or more of a sheet thickness, and a second shear droop falls within a range of 0.45 times or more of the sheet thickness.

Figure 2:
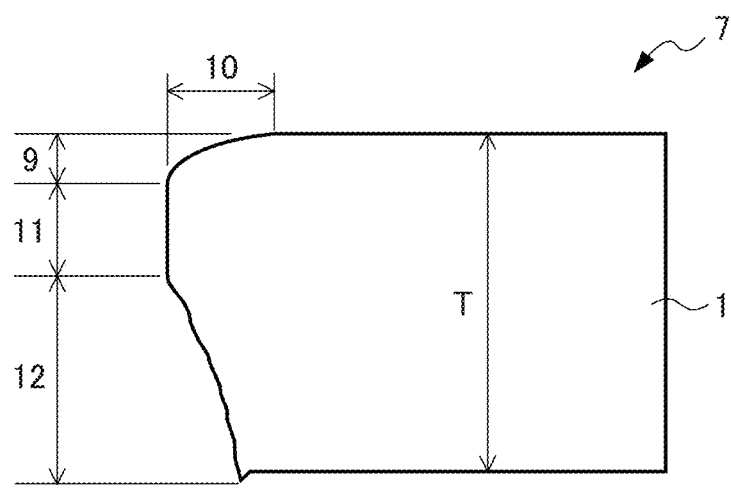
FIG. 2 shows a schematic cross-sectional view for illustrating a shear droop Z and a shear droop X at a cut end-face.

Here, in the cutting process, cutting, punching, piercing, and the like are performed with a shear tool. FIG. 2 schematically shows a cross-sectional shape of a steel sheet created by a cutting process. As shown in FIG. 2, a first shear droop 9, a second shear droop 10, a shear surface 11, and a fracture surface 12 are formed on a cut end-face after a cut process is performed. Among these, the first shear droop 9 and the second shear droop 10 are formed when a surface of a steel sheet is deformed due to a tensile force acted on the surface of the steel sheet as a punching process of the steel sheet progresses. As used herein, the first shear droop 9 which appears in the sheet-thickness direction of a steel sheet is referred to a "shear droop Z", and the second shear droop 10 which appears in the planar direction is referred to a "shear droop X."

A shearing process of a surface treated steel sheet under these conditions can enhance both a tensile force and a shear force acted on the steel sheet, allowing a plating metal layer originally coated on a surface of an underlying steel sheet to wrap around a cut end-face. At least a portion of a shear surface of the cut end-face is coated with the above wrapping-around plating metal layer, and this coated plating metal layer can provide a sacrificial anticorrosion effect, preventing the development of red rust on the cut end-face.

Figure 3:
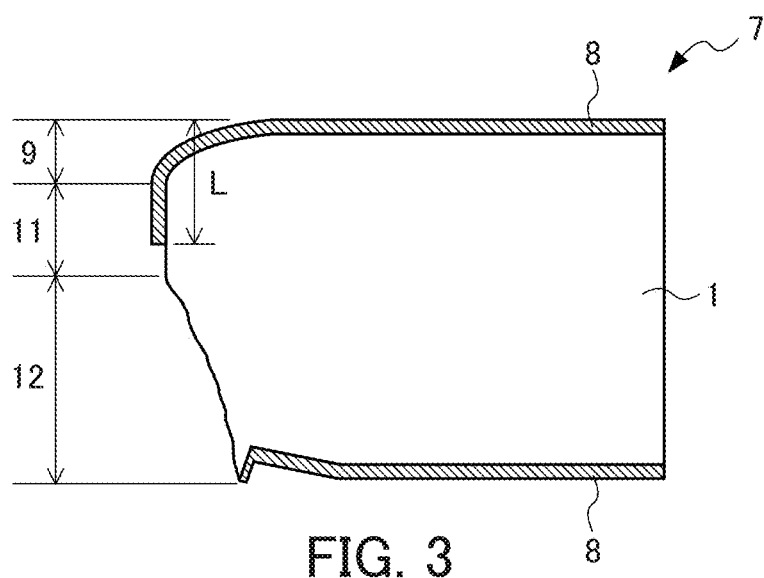
FIG. 3 shows a schematic cross-sectional view for illustrating a length L where a cut end-face is wrapped around with a plating metal.

Here, a length L where the cut end-face is wrapped around with a plating metal layer 8 is defined as the total of the thickness of a shear droop Z 9 including the thickness of the plating metal layer 8 along the thickness direction of a surface treated steel sheet and the length of the plating metal layer 13 wrapping around a shear surface 11 as shown in FIG. 3.

The upper limits of the lengths of the shear droop Z 9 and the shear droop X 10 as shown in FIG. 2 are appropriately selected depending on a sheet thickness T of a steel sheet and conditions of a shearing process. Among these, the upper limit of the length of the shear droop Z is preferably 0.40 times or less of the sheet thickness, more preferably 0.25 times or less of the sheet thickness. Further, the upper limit of the length of the shear droop X is preferably 1.50 times or less of the sheet thickness, more preferably 1.00 times or less of the sheet thickness.

Deformation and movement of a plating metal due to a tensile force are promoted by controlling the shape of a cut end-face so that the lengths of shear droops fall within the aforementioned ranges according to the present invention. This can increase the amount of a plating metal wrapping around the cut end-face, and thus can also increase the area to be coated by the plating metal on the cut end-face. This, in turn, can improve initial corrosion resistance of the cut end-face. A smaller length of a shear droop would decrease the deformation and movement of a plating metal, resulting in insufficient wrapping around of a cut end-face with the plating metal.

Here, the length of a shear droop can easily be controlled by adjusting a clearance of a cutting tool and a curvature radius of a die-apparatus shoulder of the tool, but can also be controlled by changing conditions such as a cutting speed (a punching speed) of the movement of a die apparatus.

(Surface Treated Steel Sheet)

As a surface treated steel sheet for use in the present invention, a steel sheet having a plated surface is preferably used. Here, examples of plating include Zn-base, Zn—Al based, Zn—Al—Mg based, Zn—Al—Mg—Si based metal plating or alloy plating. Among these, a steel sheet on which Zn—Al—Mg based alloy plating is preferably used. Here, for alloy plating, 80 mass % or more of Zn, more preferably 90 mass % or more of Zn is contained relative to the total number of moles of the plating.

Here, for the plating amount on a surface treated steel sheet, the lower limit is preferably 60 g/m2, more preferably 90 g/m2, and the upper limit is preferably 450 g/m2, more preferably 190 g/m2. In particular, when the plating amount on a surface treated steel sheet is 90 g/m2 or more, wrapping around of a cut end-face with a plating metal can be facilitated, leading to improved corrosion resistance after a shearing process.

According to the present invention, a part having excellent corrosion resistance at a cut end-face can be obtained even when a surface treated steel sheet having a large sheet thickness is used. The sheet thickness of a surface treated steel sheet to be subjected to a cutting process may be appropriately selected based on the shape, mechanical strength, weight, and the like of a part to be made. For example, even when a surface treated steel sheet having a sheet thickness of more than 2.0 mm, a cut end-face is sufficiently wrapped around and coated with a plating metal, leading to improved corrosion resistance after a cutting process.

(Cutting Process)

Figure 1A:
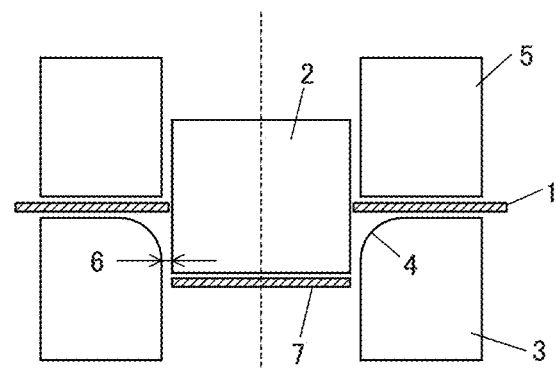
FIG. 1A and FIG. 1B shows one embodiment of a cutting process according to the present invention.
Figure 1B:
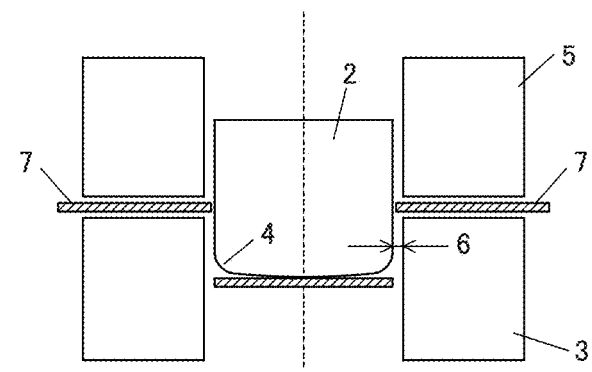

A die apparatus including a die and a punch is used for a cutting process of a surface treated steel sheet. Here, 1A and 1B of FIG. 1A and FIG. 1B show examples of a cutting process of a surface treated steel sheet 1 using die apparatus 2, 3. As shown in FIG. 1A and FIG. 1B of FIG. 1A and FIG. 1B, the surface treated steel sheet 1 sandwiched between a die 3 and a hold-down pad 5 is sheared by pressing with a punch 2 to obtain a separated part 7. At least either one of a shoulder portion of the die 3 (FIG. 1A) or a shoulder portion of the punch 2 (FIG. 1B) is preferably configured to have a curved shape with a curvature radius.

A shoulder portion of either one of the die 3 or punch 2 of the die apparatus having a curved shape at a portion to be brought into contact with a surface treated steel sheet can allow the steel sheet to be deformed along a shoulder of the die 3 or a shoulder of the punch 2 when a cutting process is performed. This can facilitate stretching of the steel sheet in the planar direction to contribute to increase in the shear droop X and the shear droop Z. To this end, the curvature radius conferred on a die apparatus is preferably 0.12 times or more of the sheet thickness of a surface treated steel sheet. For example, the embodiment shown in FIG. 1B represents an example where a die apparatus is used which includes the punch 2 having a curved shoulder. The steel surface of a surface treated steel sheet at the side sandwiched between the die 3 and the hold-down pad 5 can be deformed more easily as the above punch 2 is being pushed in. This can facilitate wrapping around of a cut end-face with a plating metal, leading to production of the part 7 having excellent corrosion resistance at the cut end-face. The schematic diagram shown in FIG. 2 corresponds to a cut end-face of the part 7 located in the right-hand side of FIG. 1B. When a die apparatus including the die 3 having a curved shoulder as shown in FIG. 1A is used, a change in the aforementioned steel surface is facilitated at a cut end-face of the part 7 which will fall into the hole side of the die 3. This, in turn, can facilitate wrapping around of the cut end-face with a plating metal, leading to production of the part 7 having excellent corrosion resistance at the cut end-face.

The upper limit of a curvature radius to be conferred on a die apparatus is preferably 0.50 times or less of the sheet thickness of a surface treated steel sheet, more preferably 0.30 times or less.

The clearance between a die and a punch in a die apparatus is preferably 20% or less of the sheet thicknesses of a surface treated steel sheet. This can increase a shear force on a steel sheet due to the punch 2, facilitating an increase in the shear droop Z. Meanwhile, the clearance between a die and a punch is preferably 1% or more of the sheet thicknesses of a surface treated steel sheet, more preferably 3% or more in view of facilitating an increase in the shear droop X by facilitating stretching of the steel sheet in the planar direction.

A punching speed of a surface treated steel sheet by a die apparatus can be selected based on the clearance between a die and a punch. The lower limit may be preferably 10 mm/s, more preferably 20 mm/s or more. Meanwhile, the upper limit of the punching speed of a surface treated steel sheet by a die apparatus is preferably 200 mm/s, more preferably 120 mm/s or less.

EXAMPLES

As surface treated steel sheets, Zn-6% Al-3% Mg (by mass ratio) alloy plated steel sheets are used having a sheet thickness of 0.8, 1.2, 2.3, 3.2, 4.5, and 6.0 (mm) and a plating amount of 90 and 190 (g/m2). A cutting process was performed using a square die 3 with each side of 40 mm and a punch 2 with a side length varied depending on a clearance. The surface treated steel sheet 1 was held by the hold-down pad 5. In this case, a curvature radius 4 was conferred on either one of a shoulder portion of the die 3 or a shoulder portion of the punch 2 to obtain a curved shape.

The shape of a part obtained from a shearing process was measured for the lengths of the shear droop Z and the shear droop X. Further, wrapping around of a cut end-face with a plating metal was observed at a cross section of the central portion of a straight side portion of a part under a microscope to measure the length L where a cut end-face is wrapped around with a plating metal in the thickness direction of a surface treated steel sheet. It is noted that a sample used for the measurements is a surface treated steel sheet located in a side facing the die or the punch having curvature and separated after a cutting process as shown in the part 7 of FIG. 1A and FIG. 1B.

A part obtained from a cutting process was subjected to an outdoor atmospheric corrosion test, and observed every 15 days to determine the number of days before significant red rust was developed on a cut end-face. The results are shown in Table 1. The type of a surface treated steel sheet and cutting conditions for each part are also shown together in Table 1. Here, the curvature radius (the sheet thickness ratio) of a die apparatus is obtained by dividing the roundness conferred on a shoulder portion of the die 3 or a shoulder portion of the punch 2 by the sheet thickness. Those on which no roundness is intentionally conferred are indicated as "<0.01" in the corresponding column and as "None" in the column "Die apparatus with no curvature." In Example 13 according to the present invention, both the die and the punch had a curvature radius of 0.14 in terms of the sheet thickness ratio.

As shown in Table 1, in Examples 1 to 15 which correspond to the present invention, the length of the shear droop Z appearing in the sheet thickness was 0.10 times or more of the sheet thickness of a surface treated steel sheet, and the length of the shear droop X appearing in the planar direction was 0.45 times or more of the sheet thickness of a surface treated steel sheet. The cut end-faces thereof showed good corrosion resistance of 90 days or more before red-rust was developed. Further, Examples 1 to 15 according to the present invention each showed a value [B]/[A] in a range of as high as 0.30 or more. Here, the value [B]/[A] represents the ratio of a wrapping-around length of plating L ([B]) to the sheet thickness ([A]).

In contrast, Comparative Examples 1, 2, 4, and 5 showed a shear droop Z of less than 0.10. Accordingly, the number of days before red rust was developed on a cut end-face was less than 90 days, showing inferior corrosion resistance as compared with Examples according to the present invention. In these Comparative Examples, curvature was not provided in the die apparatuses. This may be responsible for a decrease in the shear droop Z.

In Comparative Example 3, the shear droop X was less than 0.45. Accordingly, the number of days before red rust was developed on a cut end-face was less than 90 days, showing inferior corrosion resistance as compared with Examples according to the present invention. Further, in Comparative Examples 1 to 5, the rate ([B]/[A]) of the wrapping-around length of plating L to the sheet thickness was in a range of less than 0.30.

These results demonstrate that a cut end-face having good corrosion resistance can be obtained when the lengths of the shear droop Z and the shear droop X both fall in the predetermined ranges or more with regard to the shape of the cut end-face.

TABLE 1

| | | Surface treated steel sheets | | Cutting conditions | | | | | Shape of cut end-face | | | | Days before red rust is |
|---|---|---|---|---|---|---|---|---|---|---|---|---|---|
| | | Sheet thickness (mm) [A] | Plating amount (g/m²) | Clearance (Sheet thickness ratio) (%) | Curvature radius of die apparatus (Sheet thickness ratio) | Die apparatus with curvature | Punching speed (mm/s) | | Length of shear droop Z (Sheet thickness ratio) | Length of shear droop X (Sheet thickness ratio) | Wrapping-around length of plating L (mm) [B] | [B]/[A] | developed at cut end-face (Days) |
| | No. | | | | | | | | | | | | |
| Inventive Examples | 1 | 0.8 | 90 | 15.0 | 0.25 | Die | 120 | | 0.20 | 0.80 | 0.25 | 0.31 | ≥90 |
| | 2 | 1.2 | | 1.0 | 0.20 | Die | 120 | | 0.12 | 0.46 | 0.70 | 0.58 | ≥90 |
| | 3 | 1.2 | | 15.0 | 0.25 | Die | 120 | | 0.25 | 1.00 | 0.65 | 0.54 | ≥90 |
| | 4 | 2.3 | | 5.0 | 0.22 | Die | 120 | | 0.15 | 0.60 | 1.40 | 0.61 | ≥90 |
| | 5 | 2.3 | | 20.0 | 0.13 | Die | 120 | | 0.25 | 0.80 | 1.80 | 0.78 | ≥90 |
| | 6 | 3.2 | | 1.7 | 0.13 | Die | 120 | | 0.10 | 0.45 | 1.40 | 0.44 | ≥90 |
| | 7 | 3.2 | | 1.7 | 0.16 | Die | 100 | | 0.12 | 0.47 | 2.50 | 0.78 | ≥90 |
| | 8 | 3.2 | | 5.0 | 0.16 | Die | 120 | | 0.14 | 0.60 | 2.20 | 0.69 | ≥90 |
| | 9 | 3.2 | | 15.0 | 0.13 | Punch | 120 | | 0.20 | 0.65 | 2.00 | 0.63 | ≥90 |
| | 10 | 3.2 | 190 | 5.0 | 0.16 | Die | 80 | | 0.13 | 0.54 | 2.70 | 0.84 | ≥90 |
| | 11 | 3.2 | | 15.0 | 0.16 | Die | 120 | | 0.20 | 0.60 | 2.40 | 0.75 | ≥90 |
| | 12 | 4.5 | 90 | 3.0 | 0.30 | Die | 120 | | 0.13 | 0.55 | 3.50 | 0.78 | ≥90 |
| | 13 | 4.5 | | 10.0 | 0.14 | Die, Punch | 120 | | 0.14 | 0.55 | 3.10 | 0.69 | ≥90 |
| | 14 | 6 | | 3.0 | 0.12 | Die | 120 | | 0.13 | 0.53 | 5.00 | 0.83 | ≥90 |
| | 15 | 6 | | 10.0 | 0.23 | Die | 120 | | 0.14 | 0.46 | 4.80 | 0.80 | ≥90 |
| Comparative Example | 1 | 0.8 | 90 | 8.0 | ≤0.01 | None | 120 | | 0.08 | 0.50 | 0.10 | 0.13 | 75 |
| | 2 | 1.2 | | 5.0 | ≤0.01 | None | 120 | | 0.09 | 0.60 | 0.30 | 0.25 | 45 |
| | 3 | 2.3 | | 1.0 | 0.20 | Die | 120 | | 0.10 | 0.40 | 0.60 | 0.26 | 30 |
| | 4 | 2.3 | | 3.0 | ≤0.01 | None | 120 | | 0.08 | 0.45 | 0.50 | 0.22 | 30 |
| | 5 | 3.2 | | 1.7 | ≤0.01 | None | 120 | | 0.08 | 0.40 | 0.80 | 0.25 | 15 |

EXPLANATION OF REFERENCE NUMERALS

1 Surface treated steel sheet
2 Punch
4 Curvature radius conferred on shoulder of die apparatus
5 Hold-down pad
6 Clearance
7 Part
8 Plating metal layer
9 Shear droop Z (First shear droop)
10 Shear droop X (Second shear droop)
11 Shear surface
12 Fracture surface
L Wrapping-around length of plating metal
T Sheet thickness
13 Plating metal layer wrapping around shear surface

The invention claimed is:

1. A surface treated steel sheet comprising a cut end-face formed by a cutting process, the cut end-face having an excellent corrosion resistance, wherein
the cut end-face has a shape defined by a first shear droop in a sheet-thickness direction having a length 0.10 times or more and 0.40 times or less of a sheet thickness of the surface treated steel sheet, and a second shear droop in a planar direction having a length 0.45 times or more and 1.5 times or less of the sheet thickness of the surface treated steel sheet,
a surface of the cut end-face is coated and wrapped around with a plating metal layer, the plating metal layer being originally coated on a surface of the surface treated steel sheet, and
a ratio ([B]/[A]) of a wrapping-around length of plating ([B]) of the plating metal layer to a sheet thickness ([A]) of the surface treated steel sheet is 0.30 or more, wherein the wrapping-around length is defined as a total of a length of the first shear droop including a thickness of the plating metal layer along a thickness direction of the surface treated steel sheet and a length of the plating metal layer wrapping around a shear surface.

2. The surface treated steel sheet according to claim 1, wherein the surface treated steel sheet is a Zn-based plated steel sheet.

3. A method of manufacturing the surface treated steel sheet according to claim 1 by performing the cutting process of the surface treated steel sheet using a die apparatus comprising a die and a punch, the method including:

performing cutting using the die apparatus so that the die apparatus is configured so that a clearance between the die and the punch is 1 to 20% of the sheet thickness of the surface treated steel sheet, and
a shoulder portion of either one of the die or the punch has a curvature radius 0.12 times or more of the sheet thickness of the surface treated steel sheet.

4. The method of manufacturing the surface treated steel sheet according to claim 3, wherein the surface treated steel sheet is a Zn-based plated steel sheet.

\* \* \* \* \*